Patented Nov. 29, 1932

1,889,678

UNITED STATES PATENT OFFICE

CHARLES MANNICH, OF BERLIN-STEGLITZ, GERMANY

AROMATIC ESTERS OF AMINO ALCOHOLS AND PROCESS OF MANUFACTURE

No Drawing. Application filed October 3, 1930, Serial No. 486,289, and in Germany November 1, 1929.

It has been found that the aromatic esters of amino alcohols of the formula

(R being hydrogen or alkyl) possess particularly good properties as products for local anæsthesia. The alcohol bases used as starting material are derived from aldehyde bases by reduction for instance with sodium amalgam in slightly acetic acid solution, the said aldehyde bases being obtained by condensation of aldehydes of the general formula $$\begin{array}{c}R\\ \phantom{R}\diagdown\\ \phantom{RRR}CHCOH\\ \phantom{R}\diagup\\ R\end{array}$$

with formaldehyde and primary or secondary aliphatic amines. By allowing aromatic acids or derivatives, preferably acid chlorides, to act upon the alcohol bases the esters are obtained easily and with a good yield, said esters forming well crystallized hydrochlorides which are stable also in hot water.

Example 1

5.5 parts of 3-dimethylamino-2-dimethyl-propane-1-ol (boiling point 166–168° C. at 760 mm.) are dissolved in 6 parts of chloroform and, while cooling, a solution of 6 parts of benzoylchloride in a little chloroform is added. The reaction product is then heated for an hour to 40° C. and precipitated with ether. The precipitated hydrochloride is recrystallized from isopropyl alcohol. The reaction is illustrated as follows:

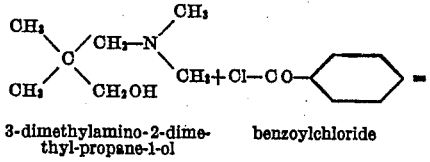

3-dimethylamino-2-dimethyl-propane-1-ol    benzoylchloride

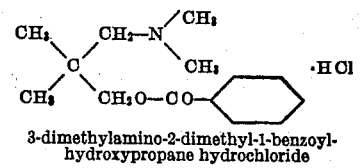

3-dimethylamino-2-dimethyl-1-benzoyl-hydroxypropane hydrochloride

Example 2

5.5 parts of 3-dimethylamino-2-dimethyl-propane-1-ol are dissolved in 6 parts of chloroform and a solution of 12 parts of p-nitrobenzoylchloride is added. After having heated for an hour to 40° C. the chloroform is removed in vacuo and the residue is stirred with ether until the salt becomes crystalline. It is recrystallized from alcohol and melts at 180° C. 1 part of the product thus purified is dissolved in 20 parts of water, 0.3 part of a 1% solution of palladium chloride is added and the product is shaken with hydrogen under pressure of 2 atmospheres. When about 220 ccm. of hydrogen have been taken up, the product is filtered and from the warm solution the base is precipitated with a solution of sodium hydroxide. It crystallizes from petrol-ether, its melting point being 79–80° C. The crystalline hydrochloride with the melting point of 93° C. is obtained therefrom in the usual manner with alcoholic hydrochloric acid and ether. The reactions are illustrated as follows:

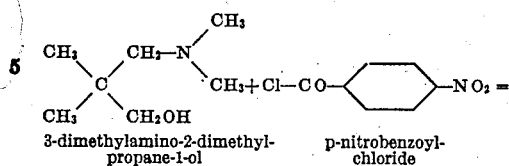
3-dimethylamino-2-dimethyl-propane-1-ol       p-nitrobenzoyl-chloride

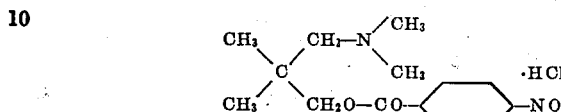
3-dimethylamino-2-dimethyl-1-p-nitrobenzoylhydroxypropane hydrochloride

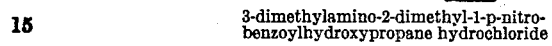
3-dimethylamino-2-dimethyl-1-p-nitrobenzoylhydroxypropane hydrochloride

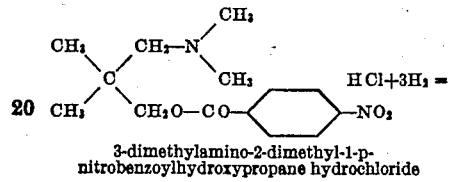
3-dimethylamino-2-dimethyl-1-p-aminobenzoylhydroxypropane hydrochloride

Example 3

4 parts of 3-diethylamino-2-dimethyl-propane-1-ol (boiling point 90–91° C. at 12 mm.) are diluted with 5 parts of chloroform and while cooling 6 parts of benzoylchloride are added. The reaction product is left standing for a few hours and then precipitated with ether. The precipitated hydrochloride of 3-diethylamino-2-dimethyl-1-benzoylhydroxypropane is recrystallized from absolute alcohol with an addition of ether and melts at 131–132° C. The reaction is illustrated as follows:

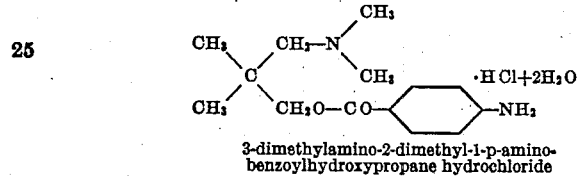
3-diethylamino-2-dimethyl-propane-1-ol       benzoylchloride

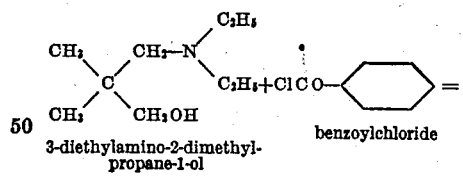
3-diethylamino-2-dimethyl-1-benzoylhydroxypropane hydrochloride

Example 4

If a solution of 5.5 parts of p-nitrobenzoylchloride in chloroform is added to 4 parts of 3-diethylamino-2-dimethyl-propane-1-ol, the hydrochloride of 3-diethylamino-2-dimethyl-1-p-nitrobenzoylhydroxypropane is formed while heating. The reaction product is left standing for a few hours, the compound is precipitated with ether and recrystallized from isopropyl alcohol (melting point 160° C.). 1 part of this product is dissolved in 15 parts of water and after the addition of 0.3 part of a 1% solution of palladium chloride and 0.1 part of animal charcoal hydrated under pressure of 2 atmospheres. When the taking up of hydrogen is terminated, the product is filtered and the solution evaporated in vacuo. The residue is recrystallized from isopropyl alcohol. The 3-diethylamino-2-dimethyl-1-p-aminobenzoylhydroxypropane hydrochloride melts at 195–196° C. The reactions are illustrated as follows:

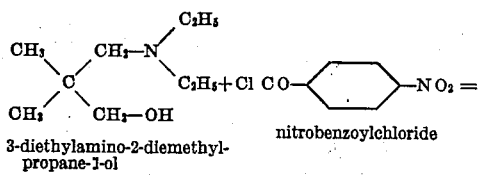
3-diethylamino-2-dimethyl-propane-1-ol       nitrobenzoylchloride

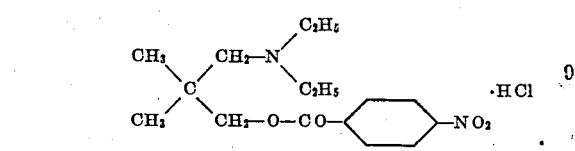
3-diethylamino-2-dimethyl-1-p-nitrobenzoylhydroxypropane hydrochloride

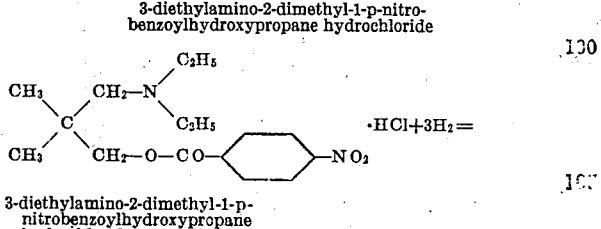
3-diethylamino-2-dimethyl-1-p-nitrobenzoylhydroxypropane hydrochloride

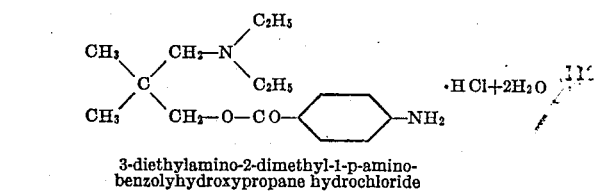
3-diethylamino-2-dimethyl-1-p-aminobenzolyhydroxypropane hydrochloride

Example 5

To a solution of 4 parts of 3-dimethylamino-2-isopropyl-propane-1-ol in 5 parts of chloroform is added slowly while cooling a solution of 5 parts of p-nitrobenzoylchloride in as little chloroform as possible. Within the course of a few hours the hydrochloride of 3-dimethylamino-2-isopropyl-1-p-nitrobenzoyl-propane crystallizes in the shape of slightly yellow needles melting at 174° C. In the usual manner, preferably by catalytic hydration, it may be transformed into the p-amino compound melting at 95° C. The hydrochloride of this base melts at 170–171° C. The reactions are illustrated as follows:

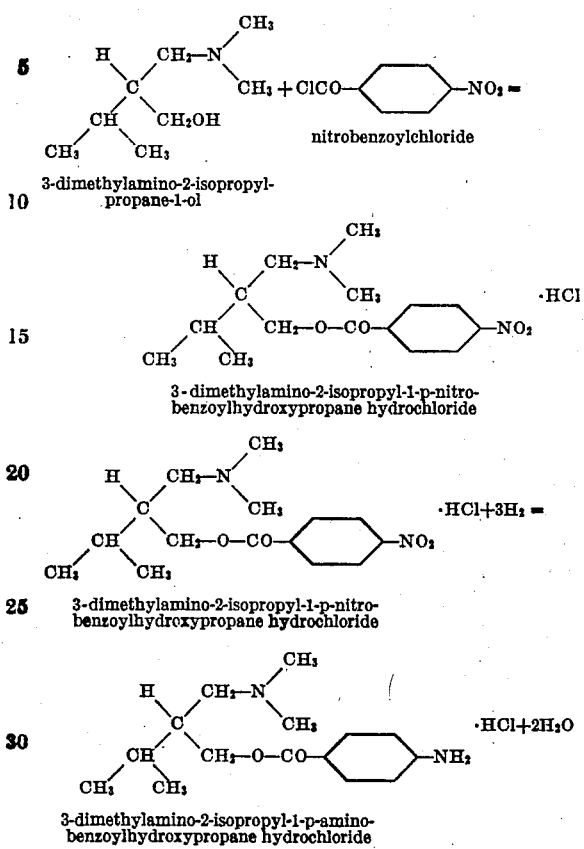

Example 6

5 parts of benzoic acid and 5 parts of 3-dimethylamino-2-dimethyl-propane-1-ol are kept for three hours under a continuous current of dry hydrochloric acid gas at 100° C. The melted product is then taken up in water, the excess of benzoic acid removed with ether, the aqueous part of the solution of sodium hydroxide made alkaline and treated with ether. After drying the ether is removed, the unchanged starting base distilled off at 64° C. and 12 mm. pressure and after addition of alcoholic hydrochloric acid and ether the residue is obtained as hydrochloride. The compound forms colourless, silvery leaflets melting at 153° C. The reaction is illustrated as follows:

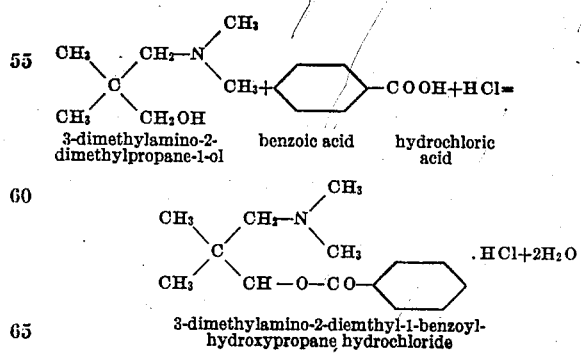

Example 7

212 parts of 3-diethylamino-2-dimethyl-propane-1-ol are dissolved in 318 parts of chloroform and a solution of 246 parts of o-nitrobenzoylchloride in 500 parts of chloroform is added drop by drop while cooling. After several hours' standing the chloroform is distilled off. The hydrochloride of the o-nitrobenzoic acid ester of diethylamino-dimethyl-propane remains as an oil easily soluble in water. By reduction with tin chloride and hydrochloric acid the o-amino compound is obtained in the usual manner, its hydrochloride crystallizes from acetone and melts at 130° C. The reactions are illustrated as follows:

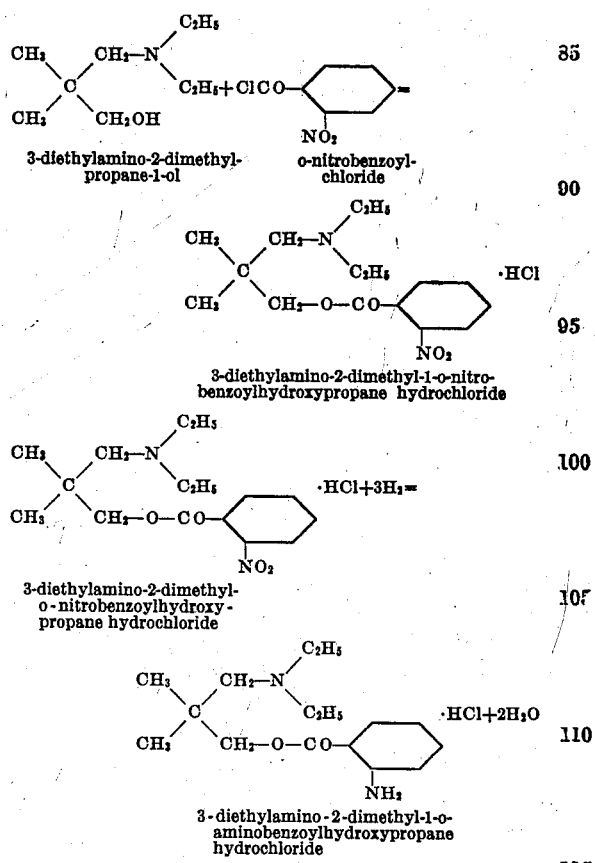

I claim:
1. The esters of alcohol bases of the general formula

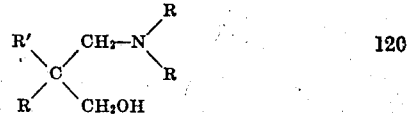

where R represents hydrogen or an alkyl radical, R' representing an alkyl radical, and aromatic carboxylic acids containing a benzene nucleus, the new products forming well crystallized hydrochlorides, which are stable in hot water and have very strong anæsthetic properties.

2. The esters of alcohol bases of the general formula

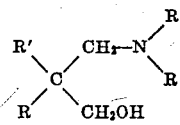

where R represents hydrogen or an alkyl radical, R' representing an alkyl radical, and carboxylic acids of the benzene series containing a nitro group or an amino group, the new products forming well crystallized hydrochlorides which are stable in hot water, and have very strong anæsthetic properties.

3. The compound 3-diethylamino-2-dimethyl-1-p-amino-benzoylhydroxypropane, which forms a well crystallized hydrochloride melting at 195–196° C., which is stable in hot water, and which has very strong anæsthetic properties.

4. The process for the manufacture of aromatic esters which consists in esterifying alcohol bases of the general formula

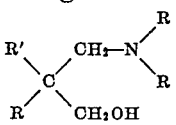

where R represents hydrogen or an alkyl radical, R' representing an alkyl radical, with aromatic acids containing a benzene nucleus.

5. The process for the manufacture of aromatic esters which consists in esterifying alcohol bases of the general formula

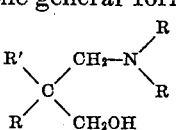

R representing hydrogen or an alkyl radical, R' representing an alkyl radical, with carboxylic acids of the benzene series containing a nitro group or an amino group.

6. The process for the manufacture of aromatic esters which consists in esterifying alcohol bases of the general formula

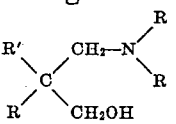

R representing hydrogen or an alkyl radical, R' representing hydrogen, with aromatic carboxylic acids containing a nitro-group, and then reducing said nitro-group.

7. The process for the manufacture of 3-diethylamino-2-dimethyl-1-p-aminobenzoyl-hydroxypropane, which consists in esterifying 3-diethylamino-2-dimethyl-propane-1-ol with p-nitrobenzoylchloride and reduction of the 3-diethylamino-2-dimethyl-1-p-nitrobenzoylhydroxypropane.

In witness whereof I have hereunto set my hand.

CHARLES MANNICH.